Sept. 20, 1932.  F. J. SIEBENMANN  1,878,000
CULTIVATING IMPLEMENT
Filed May 13, 1929   2 Sheets-Sheet 1
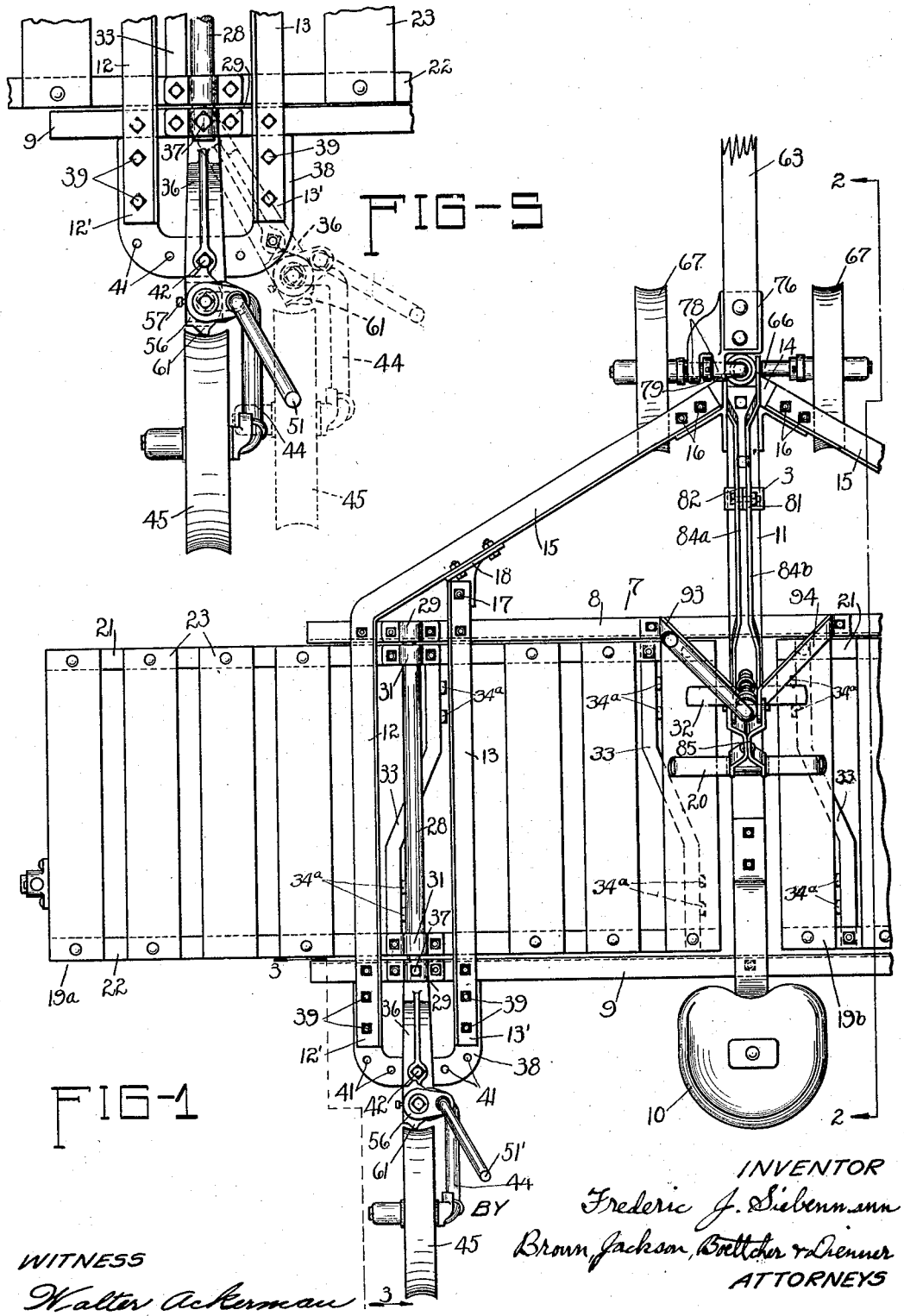

Sept. 20, 1932.  F. J. SIEBENMANN  1,878,000
CULTIVATING IMPLEMENT
Filed May 13, 1929  2 Sheets-Sheet 2
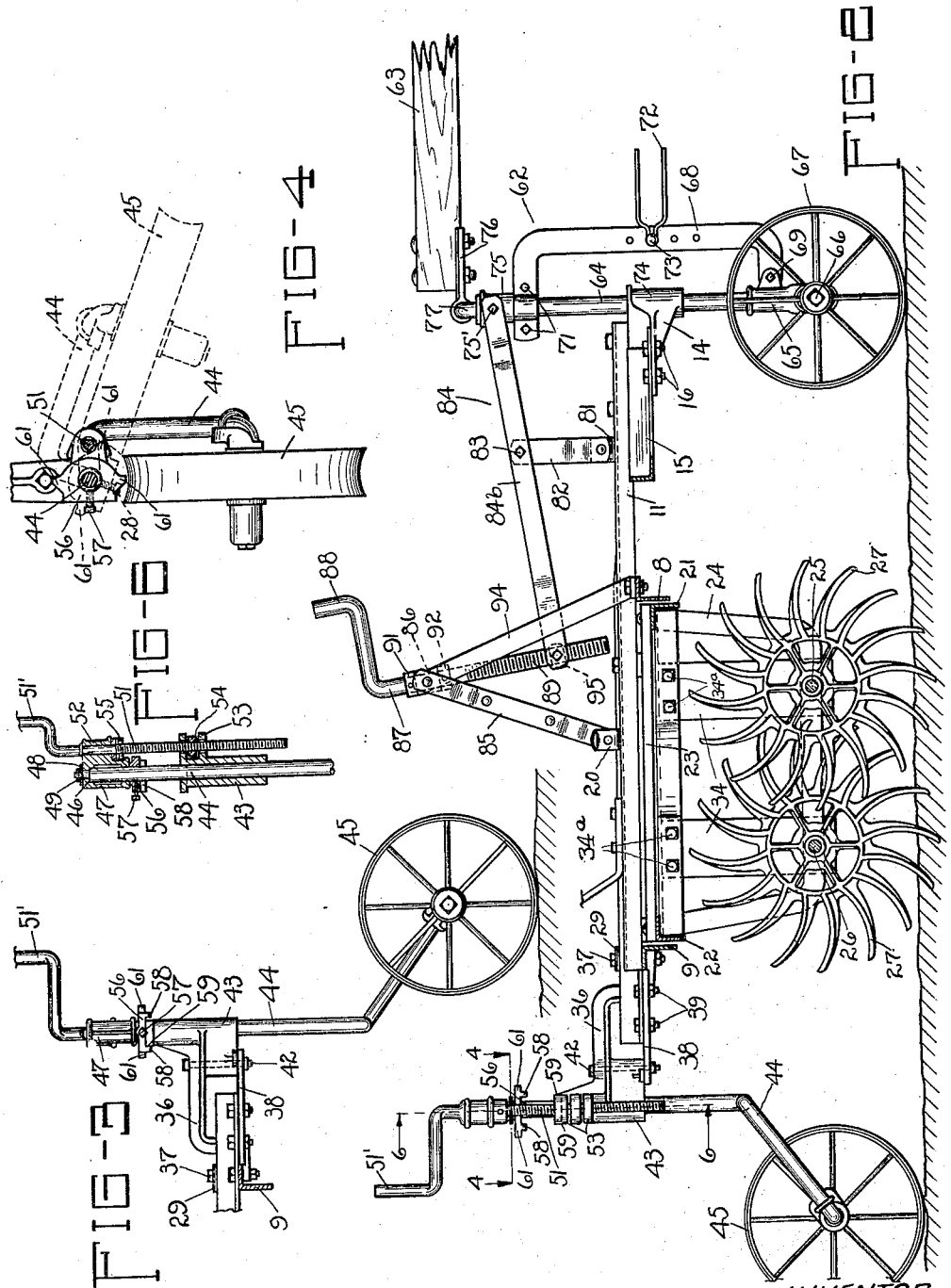
INVENTOR
Frederic J. Siebenmann
BY Brown, Jackson, Boettcher & Dienner
ATTORNEYS
WITNESS
Walter Ackerman Patented Sept. 20, 1932

1,878,000

UNITED STATES PATENT OFFICE

FREDERIC J. SIEBENMANN, OF MOLINE, ILLINOIS, ASSIGNOR TO DEERE & COMPANY, OF MOLINE, ILLINOIS, A CORPORATION OF ILLINOIS

CULTIVATING IMPLEMENT

Application filed May 13, 1929. Serial No. 362,587.

This invention relates to improvements in that type of cultivating implement commonly referred to as a rotary hoe, such implements being usually characterized by two transversely extending shafts on which closely spaced rotating hoe wheels are mounted, the latter having long, radially extending teeth adapted to enter the soil in the forward rolling motion of the hoe wheels over the ground. Such implements are frequently used in the cultivation of corn and like plants, having particular utility for breaking up crusty soil in the first or second cultivating operations.

The present invention is concerned with the construction of a rotary hoe of relatively wide span, as for cultivating three or more corn rows. A rotary hoe of this general type is illustrated and described in the application of Virgil F. Bozeman, filed February 13, 1928, Serial No. 253,835. Machines of this character have in the past been so constructed that the position of the rear supporting wheels is definitely fixed with respect to the frame so that such supporting wheels always track along the same lines relatively to the frame. It has been found desirable to be able to displace or shift such wheels relatively to the frame because sometimes the crop rows are so spaced that it is otherwise difficult or impossible to guide the implement without one or the other of the rear supporting wheels running over the plants and breaking them down. It has also been found desirable to have the rear supporting wheels operate as caster wheels when the implement is in working condition so that said wheels will be free to swing around any obstructions that may be encountered by them in traversing the field. In this regard, however, it has been found that while it is advantageous to have the rear supporting wheels free to caster when the implement is in working condition in the field, such is not desirable when the implement is being transported from one place to another, in view of the fact that the implement is rather unwieldy if the rear wheels are allowed to caster in transportation, and accordingly it is necessary that provision be made for locking said wheels against castering at such times.

One of the principal objects of the invention is to provide new and improved supporting means for the rear wheels so that said wheels may be easily and readily adjusted laterally in either direction to avoid the plant rows.

Another object of the invention is to so mount said rear supporting wheels that they are free to caster when the implement is in working condition, but which will become locked in position to prevent such castering movement when the implement is in transport condition.

A further object of the invention is to provide means for limiting the castering movement of the rear supporting wheels to prevent their coming into contact with the hoe wheels when castering.

A still further object of the invention is to provide new and improved mechanism for raising and lowering the frame with respect to the rear supporting wheels, and also new and improved mechanism for raising and lowering the frame with respect to the front supporting wheel or wheels. Other objects and advantages of the invention will appear in the following description of a preferred embodiment thereof. In the accompanying drawings illustrating such embodiment:

Fig. 1 is a fragmentary plan view illustrating the left hand side of the implement;

Fig. 2 is a cross-section taken on the line 2—2 of Fig. 1, and illustrating the relation of the parts when the hoe is in working position;

Fig. 3 is a side elevational view of the rear wheel support taken on the line 3—3 of Fig. 1, and illustrating the relation of the parts when the hoe is in transport position;

Fig. 4 is a sectional view taken on the line 4—4 of Fig. 2, illustrating in dotted lines one extreme castering position of one of the rear wheels;

Fig. 5 is an enlarged fragmentary top view of one of the rear wheel supports illustrating in full lines the normal central position of the rear supporting wheel, and in dotted lines an alternative lateral position thereof; and Fig. 6 is a cross section taken on the line 6—6 of Fig. 2.

The main frame of the implement is indicated as a whole by the numeral 7, and comprises transversely extending front and rear angle bars 8 and 9 which are secured together at the center of the implement by a longitudinal frame bar 11 bolted or otherwise secured to the horizontal flanges of the transverse frame bars 8, 9. The end portions of the transverse bars 8, 9 are joined together at the sides of the frame by laterally spaced pairs of angle bars 12 and 13 which are also bolted or otherwise secured to the horizontal flanges of the angle bars 8, 9. Fig. 1 only illustrates the lateral frame bars 12, 13 at the left hand side of the implement, but it will be understood that this arrangement of lateral frame bars is also duplicated at the right hand side of the frame. The lateral frames bars 12, 13 are extended rearwardly beyond the frame bar 9, as indicated at 12', 13', for a purpose hereinafter described.

The longitudinally extending central frame bar 11 extends forwardly from the transverse frame bar 8 and has a casting 14 secured to its front end, which provides suitable mounting of such frame bar on a tongue truck to be described later. The front portion of the outermost lateral frame bar 12 is bent inwardly toward the center of the implement, as indicated at 15, the front end of this diagonal portion being bolted to the casting 14, as indicated at 16. The front end of the inner lateral frame bar 13 is bolted or otherwise secured at 17 to a bracket 18 which is secured to the inner side of the diagonal frame bar 15. The diagonal frame bar portions 15 on each side of the implement serve to brace the main frame against lateral or twisting distortion. A suitable spring seat support carrying a driver's seat 10 is mounted on the central frame bar 11, and a foot rest 20 is also provided on the bar 11, as shown in Fig. 1.

The specific construction of the sub-frames which carry the rotary hoe wheels has nothing to do with my present invention, and as they are similar in construction and operation to those illustrated and described in the above mentioned application of Virgil F. Bozeman, Serial No. 253,835, only a brief description thereof will be herein given. These sub-frames are indicated by the reference numerals 19ª, 19ᵇ, and each comprises transversely extending front and rear angle bars 21 and 22 which are cross-connected at spaced points by boards 23 which have their ends bolted or otherwise secured to the horizontal flanges of the angle bars 21, 22. Rigidly secured to and depending from the opposite ends of the bars 21, 22 are U-shaped side bars 24 (see Fig. 2), which side bars 24 support front and rear shafts 25, 26, each pair of front and rear shafts being individual to its respective sub-frame. The rotary hoes, indicated by the numeral 27, consist of wheels having long pointed teeth adapted to penetrate the soil with a rolling motion in the forward travel of the implement. A plurality of these hoe wheels 27 are loosely mounted on each of the shafts 25, 26, and are so arranged on said shafts that the wheels of one series are disposed in staggered or offset relation with respect to the wheels of the other series, and the two series of wheels overlap each other transversely of the implement. The mounting of these hoe wheels is fully illustrated and described in the above mentioned Bozeman application.

Each sub-frame is pivotally supported on the main frame for transverse rocking movement about a longitudinally extending pivot shaft 28 which is mounted on the outer end of the main frame, preferably between the lateral frame bars 12, 13. The front and rear ends of the shaft 28 are carried in brackets 29 which are secured to the front and rear bars, 8, 9 of the main frame. The front and rear bars 21, 22 of the sub-frame have pivot brackets 31 secured thereto, which pivot brackets have pivotal mounting on the shaft 28. The mounting of the other gang or section 19ᵇ at the right hand side of the implement is substantially the same as described and illustrated in Fig. 1. It will thus be seen that a flexible relation is established between the hoe wheels at opposite sides of the implement. It may be mentioned, also, that each sub-frame is pivotally supported in an unbalanced relation on the main frame with one end heavier than the other, and there is provided holding means which is operable to prevent the heavy end of the sub-frame from rocking downwardly into engagement with the ground when the main frame is lifted to transport position. The sub-frames may be arranged so that either end has the excess of weight, but in the construction illustrated I have shown the pivot axis disposed closer to the inner end of the sub-frame so that the outer end thereof will have such excess of weight, and I provide a bar 32 pivotally mounted intermediate its ends on the central frame bar 11, so that said bar 32 can be turned to a transverse position, which is that shown in Fig. 1, in which position its two arms extend over the ends of the two sub-frames for limiting the upward swinging movement of these ends of the sub-frames. By turning the bar substantially into parallelism with the frame bar 11, the inner ends of the sub-frames are free to rise and fall through a considerable angle in the cultivating travel of the hoe wheels over uneven ground, all of which is more fully described in the above mentioned Bozeman application.

Each of the sub-frames 19a, 19b is suitably braced at a point below the pivot axis 28 and also at the inner end of the sub-frame by brace bars 33 connected at their opposite ends to the front and rear angle bars 21, 22, as shown in Fig. 1. Secured to each of the brace bars 33 by bolts 34ª are a pair of downwardly extending members 34, one located adjacent to each end of each brace bar 33, see Figs. 1 and 2, said members each being provided adjacent to its lower end with a suitable bearing hole for the reception of the shaft 25 or the shaft 26 as the case may be, said members 34 thus serving as central and inner end supports for said shafts.

The rear wheel support comprises a suitable arm in the form of a casting 36 which at its front end is pivotally mounted on the horizontal flange of the rear transverse bar 9 of the main frame by means of a bolt 37 which passes through the bracket 29 and the pivot shaft 28. Said bolt, therefore, serves to hold both the front end of the casting 36 and the pivot shaft 28 in position. A U-shaped member or plate 38 is secured to the rearwardly extending portions 12', 13' of the lateral frame bars 12, 13 by bolts 39, and extends rearwardly therefrom as shown in Figs. 1 and 5. The U-shaped plate 38 is provided with a series of holes 41 which are positioned in an arc of a circle whose center is at the center of the bolt 37, and the arm or casting 36 is adapted to be releasably secured to the U-shaped member 38 in different angular positions by means of a bolt 42 which is passed through said casting and one of the holes 41 provided in said U-shaped plate. It will thus be seen that the casting 36 may be placed in any one of a number of angular positions, and while in the drawings I have shown five of such positions any desired number may be provided. In Fig. 5 I have shown the rear wheel and its support in full lines in its normal position, and in dotted lines I have shown it in one of the lateral positions in which it may be set by means of the parts just described.

The rear portion of the casting 36 is in the form of a vertical sleeve 43 which provides a vertical bearing for a spindle 44 upon the lower end of which the rear supporting wheel 45 is journaled. The upper end of the spindle 44 is provided with a shoulder 46 upon which rests a supporting member or cap in the form of a casting 47, said casting being held in position on the upper end of the spindle 44 by means of a washer 48 and nut 49 screwing down over the upper threaded end of the spindle 44, as shown in Fig. 6. A depth control screw shaft 51 is journaled in a lug 52 extending laterally from the upper end of the supporting member 47, said screw shaft being provided with a crank handle portion 51' for operating the same. The vertical sleeve portion 43 of the casting 36 is provided with two spaced perforated lugs 53 which extend laterally from said sleeve portion in alinement with the laterally extending lug 52 of the casting 47. A nut 54 is positioned non-rotatably between the lugs 53, and the threaded portion of the screw shaft 51 threads through said nut, as shown in Fig. 6. A collar 55 is pinned on the screw shaft 51 below the lug 52 to hold it in position in its bearing in the casting 47.

Adjustably mounted on the spindle 44 between the casting 47 and the vertical sleeve portion 43 of the casting 36 is another casting in the form of a plate 56 which is held in position by a set screw 57, said plate 56 being provided with two parallel depending flanges 58 on its lower side which are adapted to embrace two parallel faces 59 provided on the upper end of the sleeve 43, when the hoe is raised to transport position with the parts in the position shown in Fig. 3. By this arrangement the spindle 44 is locked in position to prevent turning thereof in its bearing in the sleeve 43, and thereby preventing the rear wheel from castering when the implement is in transport position.

The plate 56 is also provided with two substantially diametrically opposite ears 61, (see Figs. 3 and 5) which project outwardly therefrom sufficiently to strike the crank screw 51 as the spindle 44 is turned in either direction by the castering of the wheel 45, as shown in Fig. 4. It will thus be seen that by this arrangement the wheel 45 is limited in its castering movement by the ears 61 on the plate 56, so that said wheel will not strike the rear rotary hoes. The dotted line position of the supporting wheel shown in Fig. 4 illustrates one of these end positions limited by the stops 61. In this connection it should be explained that the plate 56 should preferably be positioned on the spindle 44 so that the wheel 45 may caster approximately the same amount in either direction. Therefore, as the position of the arm 36 is shifted on the U-shaped member 38 as above described, the position of the casting or plate 56 should be changed accordingly. It will be correctly positioned if, when the caster wheel is parallel to the line of advance, a line drawn through the two opposite ears 61 is parallel to the center line of the arm or casting 36. When so positioned the spindle 44 will be permitted to swing to about the same extent in either direction. Fig. 1 only illustrates the rear supporting wheel at the left hand side of the implement, but it will be understood that a similar wheel having the same mounting and cooperating stops is provided at the right hand side of the frame.

From the foregoing description it will be seen that when it is desired to adjust either or both of the two rear supporting wheels laterally to prevent their running over and breaking down the plants, this may be accomplished in the case of each wheel by loosening the bolt 37 and removing the bolt 42, after which the arm 36 can be moved in either direction on the plate 38 to the position desired, and the hole in the arm 36 through which the bolt 42 passes is then alined with the proper hole in the U-shaped member 38, after which the bolt 42 is again placed in position and it and the bolt 37 are tightened up. At the same time the set screw 57 is loosened and the casting or plate 56 is adjusted to the proper position as above described, so that the ears 61 will permit the castering of the wheel 45 to the same extent in either direction, and will also prevent such castering movement from continuing too far in either direction, so that the wheel 45 will not strike the hoe wheels, as above mentioned. Such adjustment of the plate 56 also disposes the shoulders 58 where they will embrace the faces 59 for holding the supporting wheel tracking straight ahead when the frame is raised to transport position.

The rear end of the implement is raised and lowered by means of the screw shafts 51 provided on each rear wheel support. Fig. 2 shows the position of the parts when the hoe wheels are in operating position, and when in such position the rear wheels 45 have castering movement to a limited extent, as above described. When it is desired to raise the hoe wheels to transport position the operator turns the screw crank 51' of each of the wheel supports in the proper direction to raise the nut 54 and sleeve 43 upwardly along the wheel standard 44, and when the parts have reached the proper position for transport the plate 56 will engage on the top of the sleeve 43 and the two parallel depending flanges 58 of said plate will embrace the two parallel faces 59 provided on the upper end of said sleeve, thereby locking the spindle 44 against turning in its bearing so that the wheel is held against castering. When it is desired to lower the hoe wheels to operating position, the operator turns the screw cranks 51' in the opposite direction until the parts again assume the position shown in Fig. 2.

A tongue truck 62 is interposed between the front end of the implement and the draft tongue indicated at 63, so as to prevent the downwardly tipping weight of the front end of the implement being transmitted to the neck yoke of the team, and also to provide for raising and lowering the front end of the implement relatively to the ground in the raising and lowering of the hoe wheels out of and into operative position. Referring to Figs. 1 and 2, such tongue truck preferably comprises a vertical standard 64, the lower end of which is secured in an inverted T-shaped bearing bracket 65. Extending horizontally through this bracket is an axle 66 on the outer ends of which the two truck wheels 67 are journaled. A C-shaped bar 68 has its lower end secured to the bracket 65, as indicated at 69, while its upper end is rigidly clamped to the standard 64, above the casting 14, by bolts 71, as shown in Fig. 2. Draft is transmitted to the implement through a draft clevis 72 which is coupled at 73 to the bar 68, the latter being provided with a plurality of vertically spaced holes for receiving the coupling pin 73 in order that the point of draft hitch may be raised or lowered relative to the implement, as shown in said figure. The vertical sleeve portion 74 of the casting 14 has slidable and rotatable bearing engagement on the standard 64. Mounted on said standard and resting on the top of the upper arm of the C-shaped bar 62 is a sleeve 75. This sleeve 75 also has rotatable movement upon the standard 64. The front end of the implement frame is caused to move upwardly and downwardly along the standard 64 by means which will be presently described.

The draft tongue 63 has a bracket 76 secured to its rear end, which bracket is pivotally connected at 77 to the laterally bent upper end of the standard 64. The bracket 76 is forked to provide laterally spaced hub portions 78 engaging over the pivot arm 77, the hub portions being held on the pivot arm by a collar 79 which is secured to the pivot arm between the hubs, as shown in Fig. 1.

Pivotally mounted at its lower end on a bracket 81 secured to the longitudinal frame bar 11 is a link 82, and pivotally mounted at 83 on the upper end of said link is a comparatively long lever 84 which comprises two spaced substantially parallel bars 84a, 84b. The forward end of the lever 84 is pivotally connected to the sleeve 75 at 75'. Suitably secured to the foot rest 20 and extending upwardly therefrom is a forked supporting member 85 provided with substantially parallel forked arms at its upper end as shown in Fig. 1, and between these forked arms is pivoted a bearing 86 for a crank screw 87 provided at its upper end with a handle portion 88 and at its lower end with a screw-threaded portion 89, as shown in Fig. 2. The crank screw 87 is rotatably held against endwise shifting in the bearing 86 by means of collars 91, 92 pinned to the crank screw on opposite sides of the bearing. The supporting member 85 is suitably braced by brace bars 93, 94, secured at their upper ends to the member 85 adjacent to the bearing 86, their lower ends being bolted to the front transverse angle bar 8, as shown. Threaded on the screw-threaded portion 89 of the crank screw 87 is a traveling nut 95, said nut being pivotally secured to the rear end of the long lever 84 between the spaced bars 84a, 84b thereof, so that as said nut travels up or down on the crank screw 87 it will move the rear end of the pivoted lever 84 correspondingly, thereby raising the link 82, which being secured to the frame 11 moves said frame and the sleeve 74 up or down on the standard 64 and causes the front portion of the frame 11 to move vertically relatively to the tongue truck.

In Fig. 2 I have shown the position of the various parts when the hoe wheels are in operative position, and if it is desired to raise the frame so as to bring the hoe wheels into transport position the front end of said frame is raised by turning the crank 87 in the proper direction to cause the traveling nut 95 to move upwardly on the threaded lower end 89 of the crank screw. This moves the rear end of the long link or lever 84 upwardly, and by reason of its pivotal connection about midway of its length on the upwardly extending link 82 the forward end of the link 84 exerts downward pressure on the sleeve 75, which, owing to its resting on the upper arm of the C-shaped bar 68 is prevented from moving downwardly, and, therefore, the frame is moved upwardly, the casting 14 moving upwardly along the standard 64, as will be readily understood. To lower the front portion of the frame the operator merely turns the screw crank in the opposite direction. The raising and lowering of the rear portion of the frame relatively to the rear supporting wheels 45 has been previously described. If the ground being cultivated is relatively hard it may be desirable to impose the added weight of these rear supporting wheels on the points of the hoe wheels, and such is effected by adjusting the screw cranks 51' to raise such supporting wheels out of contact with the ground.

I claim:

1. In a rotary hoe, the combination of a frame, a caster wheel for supporting said frame, means for adjusting the vertical position of said frame relatively to said caster wheel between operative and transport positions, and means for holding said wheel against castering when the frame is in transport position.

2. In a rotary hoe, the combination of a frame, a caster wheel for supporting said frame, means connecting said wheel with said frame permitting the castering axis of said wheel to be shifted relatively to said frame, means for raising and lowering said frame relatively to said caster wheel between transport and operative positions, and means actuated by the raising movement of the frame for locking said wheel against castering when the frame is raised to transport position.

3. In a rotary hoe, the combination of a frame, a supporting wheel for the rear portion of said frame, means permitting castering of said supporting wheel when said hoe is moving forwardly in operating position, and adjustable means for limiting the castering movement of said wheel after it has swung laterally a predetermined amount.

4. In a rotary hoe, the combination of a frame, a caster wheel for supporting said frame, means connecting said wheel with said frame permitting the castering axis of said wheel to be shifted relatively to said frame, and means for limiting the castering movement of said wheel in each of the shifted positions.

5. In a rotary hoe, the combination of a frame, a plurality of hoe wheels carried by said frame, a pair of arms pivotally connected with said frame adjacent to the outer sides thereof and extending rearwardly therefrom, a caster wheel mounted on each of said arms, means for securing said arms in different angular positions relatively to said frame to change the spacing between said caster wheels, and means for adjusting said frame vertically relatively to said caster wheels.

6. In a rotary hoe implement, the combination of a frame comprising transverse frame bars, rotary hoe wheels carried by said frame, a pair of lateral frame bars extending rearwardly beyond said transverse frame bars adjacent the opposite ends thereof, a plate connecting the rear ends of each pair of lateral frame bars, an arm pivotally mounted on one of said transverse frame bars and extending rearwardly between said lateral frame bars, a supporting wheel connected with each of said arms, and means for releasably connecting said arm with said plate in any one of a number of laterally adjusted positions whereby said supporting wheels may be adjusted laterally.

7. In a rotary hoe, the combination of a frame, a plurality of hoe wheels carried by said frame, a pair of caster wheels connected with said frame adjacent to the outer sides thereof and extending rearwardly therefrom, means for securing said caster wheels in different lateral positions with respect to said frame, and upwardly extending screw shafts operatively connected with said caster wheels and said frame for adjusting said frame vertically relatively to said caster wheels.

8. In a rotary hoe implement, the combination of a frame, hoe wheels carried by said frame, caster wheels supporting the rear portion of said frame, screw shafts for raising and lowering said frame relative to said caster wheels, and means made operative by the operation of said screw shafts for locking said wheels against castering when the frame is raised.

9. In a rotary hoe implement, the combination of a frame, a tongue truck supporting the front portion of said frame, a screw shaft operatively connected for raising and lowering said frame relative to said tongue truck, a pair of laterally spaced wheels supporting the rear portion of said frame, a screw shaft for raising and lowering said frame relative to each of said laterally spaced wheels, and means for laterally adjusting the position of said wheels.

10. In a rotary hoe implement, the combination of a frame, laterally spaced wheels supporting the rear portion of said frame, means for raising and lowering said frame relative to said wheels, a tongue truck supporting the forward portion of said frame, said tongue truck comprising a wheel supported standard, a draft clevis secured to said standard, a sleeve mounted on said standard, and a screw shaft swiveled to said frame and connected with said sleeve for moving the same vertically on said standard to raise and lower said frame relative to said tongue truck, and to said draft clevis.

11. In a rotary hoe implement, the combination of a frame, hoe wheels carried by said frame, laterally spaced wheels supporting the rear portion of said frame, a longitudinally extending frame bar comprising the front portion of said frame, a tongue truck supporting the forward end of said frame bar, said tongue truck comprising a wheel supported standard, means for raising and lowering said frame bar along said standard, said means comprising a sleeve mounted on said standard, a lever pivotally connected at one end with said sleeve, a link pivotally connected with said frame bar and with the intermediate portions of said lever, a screw shaft operatively connected with the opposite end of said lever for moving the same vertically, and means providing a swivel support on the frame bar for said screw shaft.

12. In a rotary hoe, the combination of a main frame, sub-frames flexibly mounted on said main frame, a plurality of hoe wheels rotatably mounted on each of said sub-frames, a supporting wheel for the front portion of the main frame, means for raising and lowering the front portion of the main frame relatively to said front supporting wheel, laterally spaced caster wheels for the rear portion of said main frame, means for raising and lowering said main frame relatively to said caster wheels, means for adjusting said caster wheels laterally, means for limiting the castering movement of said caster wheels when said main frame is lowered, and means for locking said caster wheels against castering when said main frame is raised.

13. In a rotary hoe implement, the combination of a frame, a plurality of rotary hoe elements carried by said frame, laterally spaced wheels supporting the main portion of said frame, a dirigible tongue truck for supporting the forward portion of said frame, said frame and tongue truck comprising two cooperating connecting members capable of relative vertical movement, mechanism for raising and lowering the forward portion of said frame relatively to said tongue truck comprising a threaded shaft, a traveling nut on said shaft, means connecting said nut with one of said members, and means for raising and lowering the rear portion of said frame relative to said laterally spaced wheels.

14. In a rotary hoe, the combination of a frame, a sleeve mounted on said frame, a spindle mounted in said sleeve, a caster wheel mounted on said spindle, a screw shaft operatively connected with said spindle and said frame for adjusting said frame vertically relatively to said caster wheel, and a stop member adjustably connected to said spindle, said stop member having laterally extending ears adapted to engage the screw shaft to limit the castering movement of said wheel, and also having depending flanges adapted to embrace the top margin of said sleeve to lock said wheel against castering.

15. In a rotary hoe, the combination of a frame, hoe wheels carried by said frame, a caster wheel for supporting said frame, means for adjusting said frame vertically relatively to said caster wheel to move said hoe wheels into and out of operative position, a spindle on which said caster wheel is mounted, a sleeve in which said spindle has rotatable and longitudinal sliding movement, and stop devices carried by said spindle and by said sleeve and adapted to be spaced longitudinally from each other when the hoe wheels are in operative position, said stop devices being adapted to be moved longitudinally into locking engagement with each other when the hoe wheels are in inoperative position.

16. In a rotary hoe implement, the combination of a frame, hoe wheels carried by said frame, caster wheels supporting the rear portion of said frame, means for raising and lowering said frame relative to said caster wheels, and means made operative by the operation of said first mentioned means for locking said wheels against castering when the frame is raised.

17. In a rotary hoe implement, the combination of a frame, a tongue truck supporting the front portion of said frame, a screw shaft operatively connected for raising and lowering said frame relative to said tongue truck, a pair of laterally spaced wheels supporting the rear portion of said frame, means for independently raising and lowering said frame relative to each of said laterally spaced wheels, and means for laterally adjusting the position of said wheels.

18. In a rotary hoe implement, the combination of a frame, a tongue truck supporting the front portion of said frame, means operatively connected for raising and lowering said frame relative to said tongue truck, a pair of laterally spaced wheels supporting the rear portion of said frame, means for independently raising and lowering said frame relative to each of said laterally spaced wheels, and means for laterally adjusting the position of said wheels.

19. In a rotary hoe, the combination of a frame, a sleeve mounted on said frame, a spindle mounted in said sleeve, a caster wheel mounted on said spindle, adjusting means connected with said spindle and said frame for moving said frame vertically relatively to said caster wheel, and a stop member adjustably connected to said spindle, said stop member having laterally extending ears adapted to engage said adjusting means to limit the castering movement of said wheel and also having depending flanges adapted to embrace the top margin of said sleeve to lock said wheels against castering.

20. In a rotary hoe implement, the combination of a frame, hoe wheels carried by said frame, caster wheels supporting the rear portion of said frame, means for raising and lowering said frame relative to said caster wheels, and means made operative by the operation of said first mentioned means for locking said wheels against castering when the frame is raised, said last mentioned means being adjustable to vary the position of the caster wheels relative to the frame when they are locked.

21. In a rotary hoe implement, the combination of a frame, hoe wheels carried by said frame, a pair of arms pivotally connected with said frame, a caster wheel mounted on each of said arms, means for raising and lowering said frame relative to said caster wheels, and means for locking said wheels against castering when the frame is raised, said last mentioned means being adjustable to vary the position of the caster wheels relative to the arms in which they are locked so as to cause said caster wheels to be locked in the same position with respect to the frame regardless of the position of adjustment of said arms.

22. In a rotary hoe implement, the combination of a frame, a pair of laterally spaced longitudinally extending arms pivotally connected on vertical axes with the frame to swing transversely in a horizontal plane, supporting wheels carried by said laterally spaced arms, means for independently raising and lowering said frame relative to said supporting wheels, and means for securing the wheels in laterally adjusted position.

23. In a rotary hoe implement, the combination of a frame, a tongue truck supporting the front portion of said frame, means carried by the frame and operatively connected for raising and lowering said frame relative to said tongue truck, brackets carried by the rear portion of said frame, supporting wheels for the frame, means for raising and lowering the frame relatively to said wheels, and wheel carrying means movable along said brackets for disposing said wheels in laterally adjusted position.

In witness whereof, I hereunto subscribe my name this 30th day of April, 1929.

FREDERIC J. SIEBENMANN.